Figure 6:
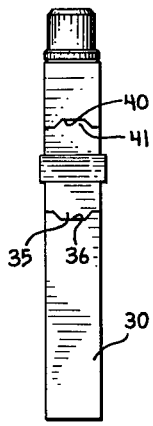

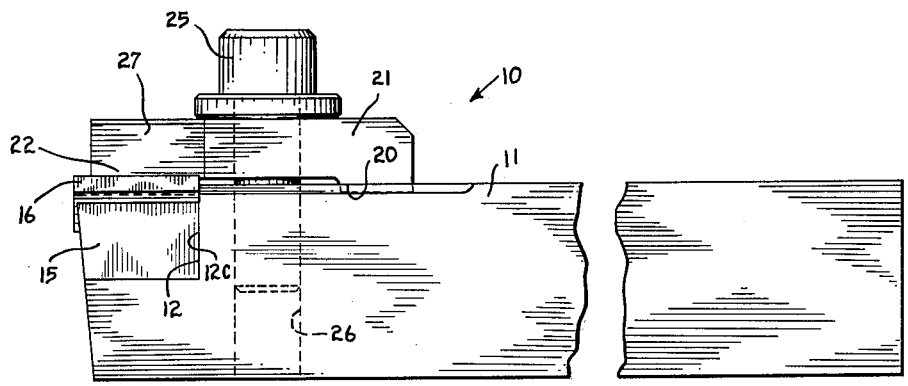
Fig. 1.
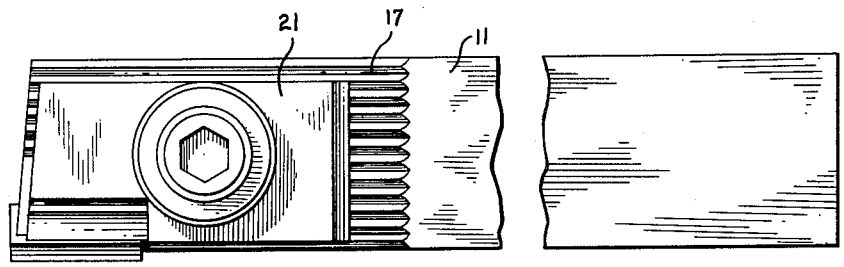
Fig. 2.
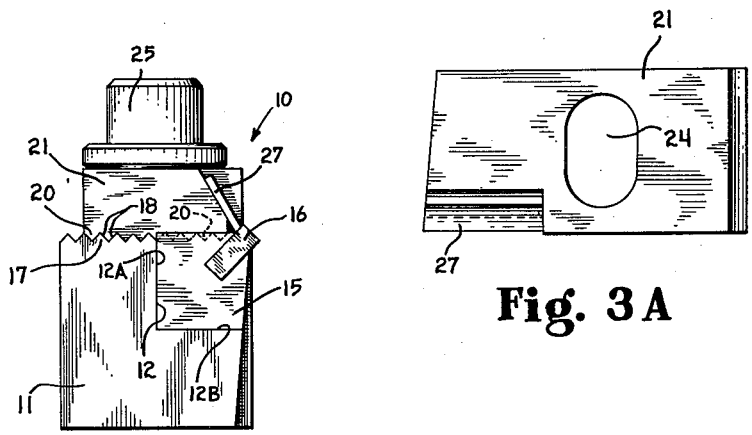
Fig. 3.
Fig. 3A
INVENTORS
HORACE A. FROMMELT
BY & ROBERT E. WATLING
Lockwood, Woodard, Smith & Weikart
Attorneys

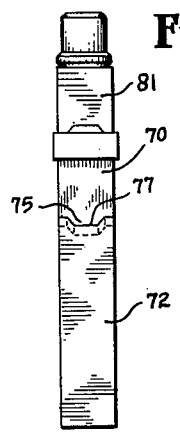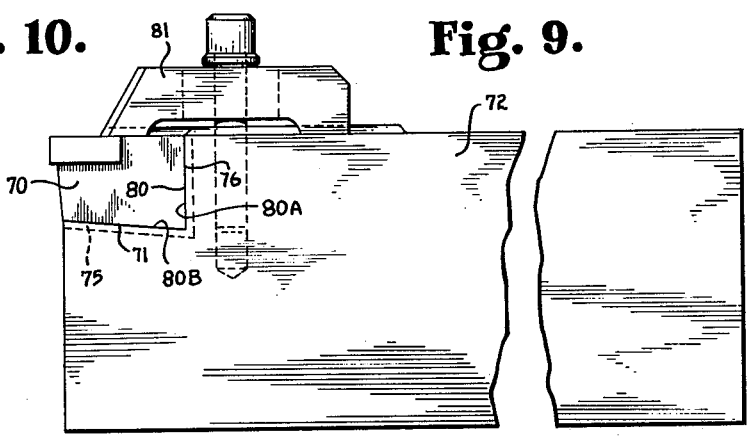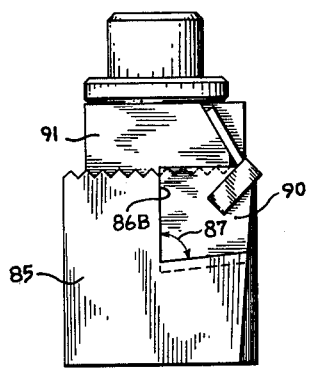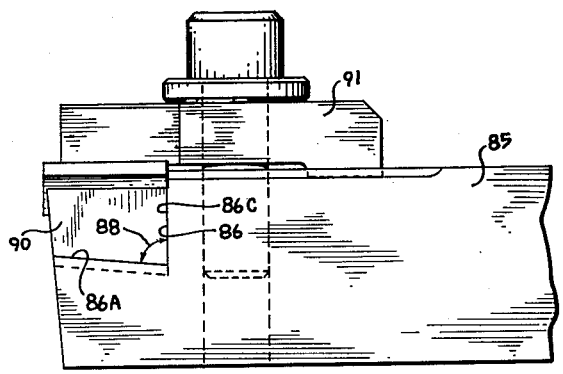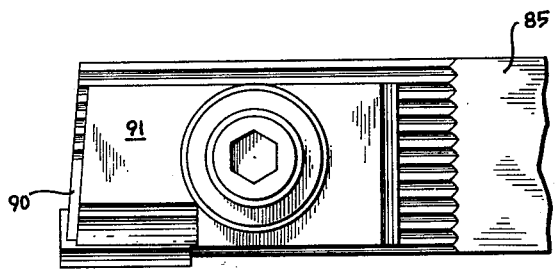

United States Patent Office 3,124,864
Patented Mar. 17, 1964

3,124,864
REPLACEABLY MOUNTED INSERT
Horace A. Frommelt, Philadelphia, Pa., and Robert E. Watling, Salem, Ind., assignors to Ferro Powdered Metals, Inc., Salem, Ind., a corporation of Indiana
Filed Oct. 5, 1960, Ser. No. 60,653
1 Claim. (Cl. 29—96)

The present invention relates to improvements in tool holders and finds an important utility in the mounting of hard bits in cut-off tools, parting tools or single point cutting tools.

"Cut-off tool" or "parting tool" are terms used by those skilled in the present art to designate tools used for cutting off portions of component materials such as bars having circular, square or hexagonal cross-section. The term "single point" cutting tool designates a cutter used in lathes, planers, shapers, vertical boring mills and similar such devices. It is the practice to provide such cut-off tools and single point cutting tools with bits formed from hard elements such as tungsten carbide, titanium carbide, high speed steel, ceramics, etc.

Because of the extremely brittle nature of carbide and ceramic bits, surface irregularities on such bits promote their fracture. Thus, present practice is to grind these bits down, in order to minimize the danger of breakage if clamping is to be employed for holding the bit, or to provide a satisfactory brazing surface if brazing is to be employed. This time consuming grinding or abrading operation adds substantially to the cost of the tool. It is estimated that the grinding operation increases the cost of using the average bit by a factor of about twice the cost of the raw bit.

Since the cost of ground carbide bits was heretofore a substantial cost factor in finished cutting tools, it was deemed necessary to resurface the bits when they become dull in order to prolong their usefulness. This meant removing the bits from the cutting tool holders or bodies, resurfacing with an expensive diamond grinding operation and then realigning and readjusting the bits in their mounts. Thus, the cost of using the tools included not only the initial high cost, but also the cost of substantial refinishing operations necessary throughout the useful life of the tool.

These problems and others relating to the mounting of hard bits have been partially solved by the invention of Horace A. Frommelt (one of the present inventors) and Fred Aberlin as described in U.S. Patent application, Serial Number 585,039, entitled Cutting Tool and Method of Making, filed May 15, 1956, now Patent No. 2,950,523, this invention providing ways for inexpensively firmly fixing hard bits in supporting elements formed from powdered metal. Thus, such hard bits mounted in powdered metal supports because of low cost, may be used until the cutting edge or operating surface is worn out and then the support with bit thereon thrown away.

It is, therefore, an important object of the present invention to provide an improved tool holder permitting quick and accurate fixing of a powdered metal, bit-carrying insert in correct operating position and permitting quick and accurate replacement of such bit carrying inserts.

A further object of the invention is to provide an improved tool holder capable of use with any type of cutting or wearing tool whether portions thereof be formed of powdered metal or otherwise.

Still another object of the invention is to provide an improved holder for use in a cut-off tool or in a single point cutting tool.

Related objects and advantages will become apparent as the description proceeds.

In accordance with the present invention, there is provided a tool holder comprising a shank having a recess, a tool carrying insert received in said recess, means for repeatedly positioning said insert in said recess in the same position, and means for clamping said insert in said position.

Figure 4:
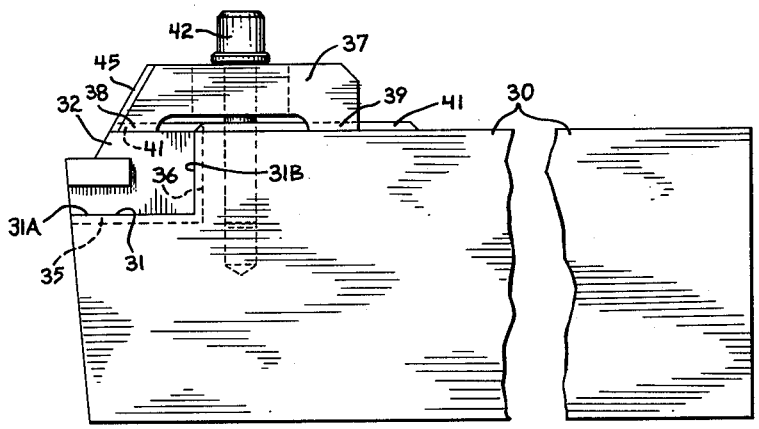
Figure 5:
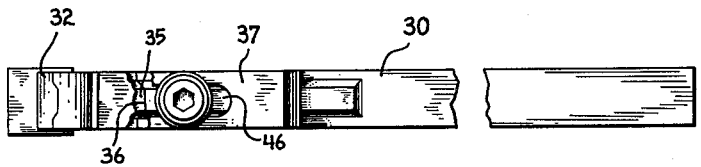
Figure 8:
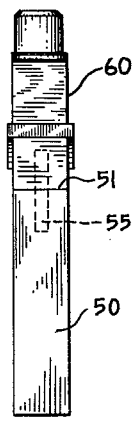
Figure 7:
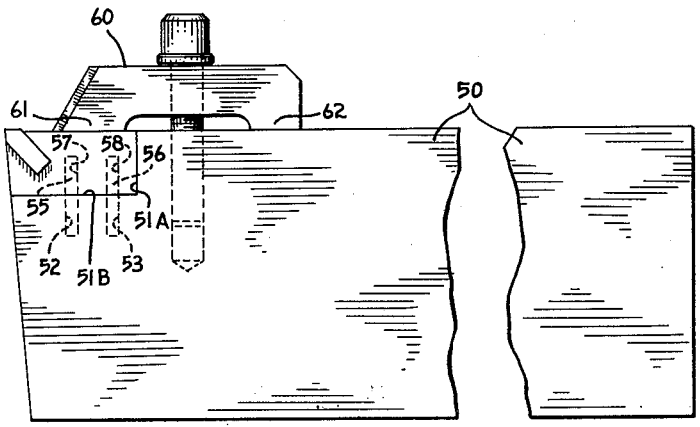

The full nature of the invention will be understood from the accompanying drawings and the following description and claims:

FIG. 1 is a side elevation of a single point cutting tool or turning tool embodying the present invention.
FIG. 2 is a top plan view of the cutting tool of FIG. 1.
FIG. 3 is an end elevation of the cutting tool.
FIG. 3A is a plan view of one of the components of the tool of FIGS. 1–3.
FIG. 4 is a side elevation of a cut-off tool embodying the present invention.
FIG. 5 is a top plan view of the cut-off tool of FIG. 4.
FIG. 6 is an end elevation of the cut-off tool.
FIG. 7 is a side elevation of an alternative embodiment of the cut-off tool.
FIG. 8 is an end elevation of the cut-off tool of FIG. 7.
FIG. 9 is a side elevation of a further alternative embodiment of the cut-off tool.
FIG. 10 is an end elevation of the cut-off tool of FIG. 9.
FIG. 11 is a side elevation of an alternative embodiment of the single point cutting tool or turning tool.
FIG. 12 is a top plan view of the cutting tool of FIG. 11.
FIG. 13 is an end elevation of the cutting tool of FIG. 11.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now more particularly to the drawings, there is illustrated in FIGS. 1–3A a single point tool or turning tool 10 including a shank 11 which has a generally rectangular, elongated shape and preferably is formed of powdered metal. The shank 11 is formed at its distal end and particularly in one corner thereof with a rectangular recess 12 which receives a bit carrying insert 15, said insert being formed preferably of powdered metal and the bit 16 carried thereby being formed of carbide, ceramics, high speed steel, stellite, diamond or any other desired hard composition. Preferably, the bit 16 is fixedly secured within the insert 15 in the manner described in the above mentioned copending application.

Formed upon the upper surface of the shank 11 contiguous the recess 12 is a plurality of serrations 17, the various surfaces 18 of which meet adjacent surfaces 18 at 90 degree angles. The serrations 17 cooperate with mating serrations 20 in the lower surface of a clamping element 21 to securely position the clamping element with respect to the shank 11.

The clamping element 21 has an arched shape, a portion of one foot 22 of which overlies the recess 12 whereby the one foot with its serrations engages the insert 15 securing it in place. It can be appreciated that the three walls 12A, 12B and 12C of the recess 12 may be used for an initial positioning of the insert 15. After such initial positioning, the clamp 21 may be forced against the insert 15 by tightening down of a fastener 25 causing the clamp to resiliently deform at its central arched portion and causing the foot 22 to securely retain the insert 15 firmly seated within the recess. The fastener 25, which is a conventional cap screw having a hexagonal recess in its head for the rotation thereof, is threadedly received within a suitable threaded bore 26 in the shank 11.

It can be appreciated that, when it is desired to replace the bit-carrying insert 15 because of wear, all that is necessary is the loosening or partial unthreading of the fastener 25 so that the clamp may either be turned 90 degrees from its illustrated position or drawn away from the insert so that it may be removed. The elongated, fastener-receiving slot 24 in the clamp 21 facilitates the moving of the clamp away from recess 12 and also permits desired positioning of the clamp. It should be noted that the clamp 21 is provided with a chip breaker 27 which is fixed to the clamp adjacent the bit 16 and which functions to break chips produced by the turning operation.

Referring now to FIGS. 4–6, there is illustrated an even more effective device for accurately clamping a replaceable bit-carrying insert in position. This alternative embodiment comprises an elongated slender shank 30 formed from powdered metal and having a recess 31 in one end thereof, the recess 31 having two perpendicular faces 31A and 31B. Received within the recess 31 is a bit-carrying insert 32 preferably formed of powdered metal and having perpendicular faces corresponding to the faces 31A and 31B. Extending from the perpendicular faces of the insert 32 is a continuous ridge 35 which is received within an indentation 36 in the shank 30, the indentation 36 being formed in the faces 31A and 31B. It can be appreciated that when the insert 32 is in the recess 31, the ridge 35 and indentation 36 will cooperate to precisely position the insert within the recess. Thus, since each replacement for the insert 32 has an identical shape to insert 32, it will be precisely positioned in the same position as was the previous insert.

A clamping element 37 has an arched shape defining two feet 38 and 39, the foot 38 engaging the insert 32 and the foot 39 engaging the shank 30. The two feet 38 and 39 are provided with aligned grooves 40 which receive aligned ridges 41 on the insert 32 and the shank 30, respectively. The clamp 37 is held resiliently downwardly by means of the clamp screw 42 which is threadedly received within a suitable bore within the shank 30. The clamp 37 is held resiliently downwardly toward the shank by means of the fastener 42 whereby the insert is even more precisely positioned by reason of the fact that the ridge 35 thereon is even more firmly seated within the indentation 36 in the shank and more particularly within the indentation 36 in the face 31A.

It should be noted that the clamp 37 may be provided with a chip breaker 45 which is fixed to the end of the clamp adjacent the bit and which functions to break chips produced by the cutting operation. It should further be noted that clamp 36 is provided with an elongated fastener-receiving slot 46 extending longitudinally of the clamp and permitting adjustment thereof to a desired clamping position.

Referring now to FIGS. 7 and 8, there is illustrated a further embodiment of the cut-off tool incorporating an alternative holder within the scope of the present invention. The structure of FIGS. 7 and 8 comprises an elongated, slender shank 50 and a recess 51 in the distal end thereof, the recess having perpendicular walls 51A and 51B similar to the above described cut-off tool holder. Formed within the shank 50 is a pair of spaced parallel bores 52 and 53 which open perpendicularly upon the face 51B of the recess 51. The bores 52 and 53 slidably receive in close fitting relation a pair of pins 55 and 56 which are also slidably received in close fitting relation within similar parallel bores 57 and 58 in bit-carrying insert 59 received within the recess 51. These pins function to align the insert 59 in the shank and to insure that each replacement for the insert 59 is in the same position as the previous insert.

The present embodiment incorporates a similar arched clamp 60 having feet 61 and 62 which respectively engage the insert and the shank. It should be noted that the clamp of the embodiments herein disclosed is capable of pivoting, after release or unthreading of the fastener to a position allowing quick and easy removal and replacement of the insert.

Referring to FIG. 9, an alternative form of cut-off tool is illustrated which is identical to the above described cut-off tool illustrated in FIGS. 4–6 with the following exceptions. The bit-carrying insert 70 has its bit arranged in a somewhat different manner with respect to the body of the insert but more important the bottom or base 71 of the insert extends at an angle of approximately 5 degrees to the length of the shank 72. The insert has a continuous ridge 75 similar to the above described ridge 35 which extends across the base 71 of the insert and across the face 76 thereof and is received within a complementary indentation 77 in the two faces 80A and 80B of the recess 80.

The fact that the base 71 of the insert and the complementary face 80B of the recess are at an angle of approximately 5 degrees to the length of the shank causes the insert to be more firmly seated in the recess 80 because the force from the clamp 81 acts directly downwardly on the insert (or at an angle of 90 degrees to the length of the shank) and thus firmly seats the insert against the faces 80A and 80B of the recess 80 and simultaneously firmly seats the ridge 75 in the indentation 77 whereby the insert is precisely positioned within the recess.

It should be noted that while the 5 degree angle mentioned above is preferred, it is not the only workable angle. Conceivably angles as small as 2 degrees would produce the desired effect. The maximum angle would appear to depend on the difficulty of molding the shank 72 (assuming it is formed of powdered metal) and also upon the possibility of the shank cracking at the apex of the recess 80 or deformation of the recess so that the the insert would be loosely instead of firmly received therein.

Referring to FIGS. 11–13, a further embodiment of the cutting tool is illustrated which identical to the above described cutting tool illustrated in FIGS. 1–3a with the following exceptions. The shank 85 is formed with a recess 86 at a distal corner thereof. This recess 86, instead of being rectangular in shape has a base surface 86A which is arranged at an acute angle with the face 86B of the recess and also at an acute angle with the face 86C of the recess. In other words, the angle 87 of FIG. 13 and the angle 88 of FIG. 11 are each acute and are preferably approximately 85 degrees. As suggested above with regard to the cut-off tool of FIGS. 9 and 10, these angles 87 and 88 do not necessarily have to be exactly 85 degrees even though this is a preferred value. Conceivably, these angles could be as great as 88 degrees and still produce the desired effect of precisely seating the insert 90 in the recess. The minimum value of these angles would be determined in like manner to that above described and would depend upon the difficulty of molding the recess 86 in the shank.

It should be mentioned that the force of the clamp 91 acts directly downwardly against the insert and thus, causes the insert to be forced against the base surface 86A of the recess and also against the other surfaces 86B and 86C of the recess whereby the insert is precisely positioned. Obviously, the three faces of the insert which engage the surfaces 86A–86C are also arranged at the same angles as the faces 86A–86C. It should be noted that, when the turning tool is in operation, the clamp 91 is not needed because the work itself will tend to hold the insert in position and against the three faces 86A–86C.

From the above description, it will be obvious that the present invention provides an improved tool holder permitting quick and accurate mounting and replacement of a bit-carrying insert. It can also be seen that the present invention also provides an improved holder for use in a cut-off tool or a single point cutting tool. It can be further appreciated that the present invention provides an improved holder for use with bit-carrying inserts formed from powdered metal.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

A tool holder comprising a generally rectangular shank having a generally rectangular recess in one end thereof formed by two faces at an acute angle of approximately 85 degrees to one another, a tool carrying insert received in said recess and having two faces mating with the faces of said recess, said insert faces being arranged at an angle of approximately 85 degrees to one another, said insert faces having a continuous ridge extending therealong, said recess faces having a continuous indentation receiving said ridge, said shank and insert having aligned ridges, a clamp having an arched shape one foot of which engages said insert and one foot of which engages said shank, said clamp having indentations in the feet thereof receiving said last mentioned ridges, a fastener securing said clamp to said shank, said fastener being threadedly received in said shank and extending through the central portion of said clamp and resiliently deforming the arch of said clamp toward said shank, the axis of said fastener being parallel to one of said recess faces whereby the force exerted thereby is parallel to said one recess face and urges through said clamp, said insert against the two faces of said recess.

References Cited in the file of this patent

UNITED STATES PATENTS

| | | |
|---|---|---|
| 1,396,180 | Fors | Nov. 8, 1921 |
| 1,974,215 | Kilmer | Sept. 18, 1934 |
| 2,181,023 | Moore | Nov. 21, 1939 |
| 2,348,262 | Oak | May 9, 1944 |
| 2,595,090 | Middleton | Apr. 29, 1952 |
| 2,675,604 | Plummer | Apr. 20, 1954 |
| 2,846,756 | Novkov | Aug. 12, 1958 |
| 2,883,737 | Wilson | Apr. 28, 1959 |

FOREIGN PATENTS

| | | |
|---|---|---|
| 639,824 | France | Mar. 17, 1928 |
| 701,534 | France | Jan. 12, 1929 |
| 704,143 | France | Feb. 17, 1931 |
| 1,105,369 | France | June 29, 1955 |
| 1,140,048 | France | Feb. 25, 1957 |
| 572,403 | Italy | Jan. 27, 1958 |
| 844,753 | Great Britain | Aug. 17, 1960 |